April 2, 1940.  G. P. MARSDEN  2,195,628
FRUIT ORIENTOR
Filed June 21, 1937
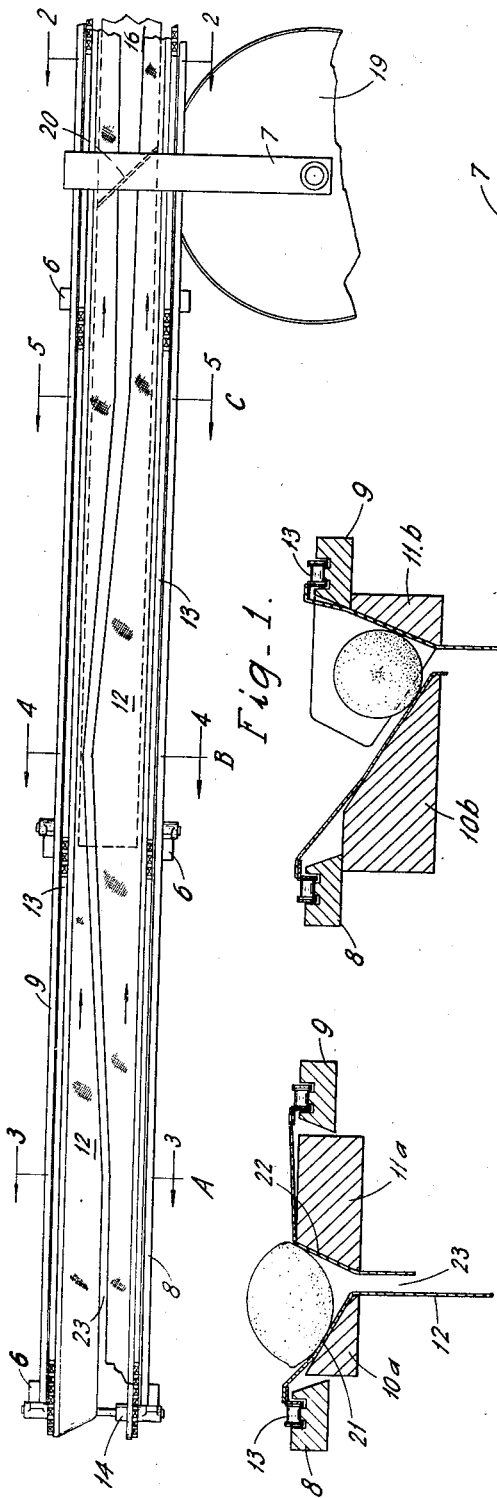
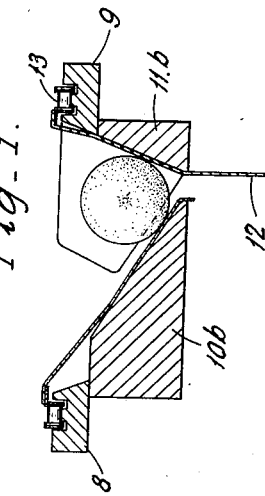
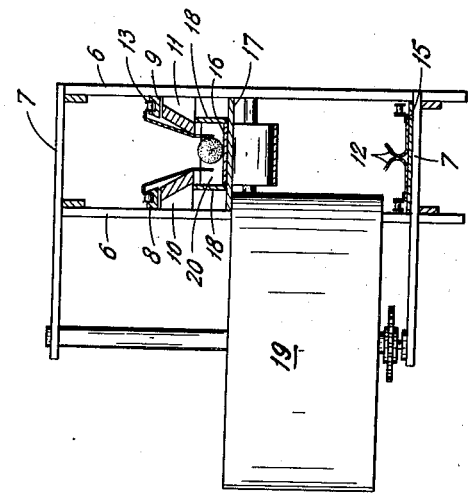
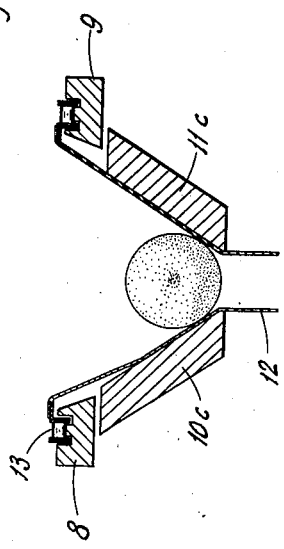
INVENTOR.
George. P. Marsden.
BY Philip A. Minnie,
ATTORNEY.

Patented Apr. 2, 1940

2,195,628

UNITED STATES PATENT OFFICE 2,195,628

FRUIT ORIENTOR

George P. Marsden, Riverside, Calif., assignor to Food Machinery Corporation, San Jose, Calif., a corporation of Delaware Application June 21, 1937, Serial No. 149,385

3 Claims. (Cl. 209—102)

This invention is concerned generally with the grading art, and relates more particularly to improvements in apparatus for grading articles, such as fruit and the like, according to size.

It is a general object of the invention to provide an improved grading apparatus which enables accurate sizing of fruit of a more or less elongated shape, such as pears, lemons, certain varieties of apples, and other similarly shaped articles.

Another object of the invention is to provide an improved sizing machine for fruit or the like, in which the fruit is positioned properly for the sizing operation by movement of the conveying means therefor.

Another object of the invention is to provide an improved sizing machine for fruit and the like of the character referred to, in which all of the fruit is positioned to be sized according to its smallest diameter.

Another object of the invention is to provide an improved sizing machine which attains the foregoing objects and which requires a minimum amount of change in known fruit sizing machines.

Another object of the invention is to provide an improved fruit sizing machine of simple and economical construction.

Further objects will appear from the following description of a preferred embodiment of the invention as illustrated in the accompanying drawing, in which:

Fig. 1 is a plan view of a fruit sizing apparatus embodying the present invention.

Fig. 2 is a transverse vertical section taken in the plane of the line 2—2 in Fig. 1, with certain of the parts shown in elevation.

Fig. 3 is a transverse vertical section through the gradeway taken in the plane of the line 3—3 in Fig. 1 and showing a lemon supported in the gradeway.

Fig. 4 is a view similar to Fig. 3, but is taken in a plane indicated by the line 4—4 in Fig. 1.

Fig. 5 is a view similar to Figs. 3 and 4, but is taken in the plane of the line 5—5 in Fig. 1.

This invention is particularly useful as applied to fruit sizers of the divergent gradeway type in which the fruit is conveyed between a pair of endless carriers arranged in spaced apart longitudinally divergent relation, so that the pieces of fruit are released at various points along the gradeway in accordance with their size. I have chosen, therefore, to illustrate the invention as embodied in this type of apparatus.

As seen in Figs. 1 and 2, the apparatus is provided with a suitable framework including the several supporting standards 6 which may be connected by suitable transverse straps or braces 7. The various standards 6 have secured thereto longitudinally extending side rails 8 and 9 (Fig. 2) and opposed grading rails 10 and 11 positioned between and below the rails 8 and 9, and which cooperate to form a V-shaped trough-like gradeway therebetween.

The apparatus as illustrated, is designed to receive the fruit to be graded at its left hand or feed end as viewed in Fig. 1, to which the fruit may be delivered by any suitable means. As the fruit is deposited on the gradeway, it is carried therealong by a pair of endless flexible aprons 12, the upper runs of which overlie and ride along the opposed inclined faces of the grading rails 10 and 11. The aprons 12 may be formed of fabric such as canvas or the like, and are secured to and driven at the same speed by respective endless chains 13 which travel in channels formed in the rails 8 and 9. The chains 13 are trained around a plurality of suitable sprockets such as indicated at 14 in Fig. 1, which are suitably journalled on the framework and driven from a source of power of suitable character, so that the upper stretches of the chains and the aprons move in the direction indicated by the arrows in Fig. 1. The lower stretches of the chains and the aprons may be supported and travel upon a suitable platform 15 secured between the standards 6 as shown in Fig. 2.

Because the divergent carrier type fruit sizing machine is well known in the art, it is believed sufficient for the purposes of this application to illustrate only that part of the machine which is necessary to disclose the features of the present invention, and their manner of cooperation with the rest of the machine. It will be understood, however, that the spacing of the grading rails 10 and 11 is so adjusted that the width of the gradeway formed thereby increases as the fruit is carried therealong, so that the individual pieces of fruit are released at various points in accordance with their size as shown for example in Fig. 2. As the fruit is released from the gradeway, it may be received upon a conveyor belt 16 which extends beneath the gradeway with its upper stretch supported by a platform 17 on which spaced apart rails 18 are provided and is driven by suitable means in the same direction and preferably at the same speed as the aprons 12 of the gradeway.

A packing bin 19 of conventional construction is suitably supported to one side of the gradeway to receive one size of fruit from the belt 16, and adjacent such packing bin 19, a shunt 20 may be provided which extends diagonally across the belt 16 to remove the fruit which has fallen through the gradeway and guide it to the packing bin. For the purposes of convenience, only one packing bin of conventional construction is illustrated, but it will be understood that additional bins are generally provided in practice.

In sizing fruit such as lemons, pears and the like, in divergent type gradeways of the character described, it is important to accurate sizing that the pieces of fruit be positioned uniformly in the gradeway to rest upon their smallest diameters with their longitudinal diameters extending lengthwise of the gradeway. This is desirable because in commercial practice the fruit is identified as to size by its smallest diameter, and also because any pieces of fruit which are positioned with their length crosswise of the gradeway will be carried past the proper point of discharge and become mixed with the larger fruit.

In order to obtain such proper positioning of the fruit in advance of the sizing operation, applicant has provided positioning mechanism for the fruit in the form of a zig-zag path of travel in the feed end of the gradeway whereby the fruit is rolled back and forth on the flexible aprons and settles at the bottom of the gradeway so that it is supported at its smallest diameter.

As seen in Figs. 1 and 3, the initial sections 10a and 11a of the grading rails are provided with inclined surfaces 21 and 22 respectively of different inclination, while the section 10a is of the smaller width so that the gradeway opening 23 between the aprons and grading rails is closer to one side of the gradeway. Thus, the fruit when fed to the apparatus is supported at a side of the gradeway and principally by the apron 12 engaging the face 21 of the rail section 10a. It is to be noted that in the feed section of the grading rails, the opening 23 between the rails is straight. At the end of the sections 10a and 11a as indicated at A in Fig. 1, opening 23 diverges from its straight course toward the opposite side of the gradeway as determined by grading rail sections 10b and 11b, so that as the aprons 12 move along the gradeway, the apron engaged with the rail 10 is in effect pulled up through the opening 23 while the other apron 12 engaged with the grading rail 11 is in effect lowered through the opening. In this manner, the pieces of fruit supported by the aprons will be rolled to effect repositioning of at least certain of the pieces from a crosswise position shown in Fig. 3 to a lengthwise position as shown in Fig. 4 where the longest diameter of the fruit is aligned with the gradeway. From point B, the grading rails are provided with sections 10c and 11c as shown in Figs. 1 and 5 which have their faces diverging back toward the center of the gradeway to point C, so that a second rolling operation is given to the pieces of fruit to insure repositioning of any fruit which remains crosswise of the gradeway after the aprons have travelled from point A to point B. From point C, the sizing operation begins and the grading rails 10 and 11 diverge sufficiently to let the smallest size pieces of fruit fall through on the belt 16 to be carried by the shunt 20 into the associated packing bin 19, while the remaining larger sizes of fruit are carried along until the aprons diverge sufficiently to permit them to fall therebetween at the proper location.

From the above description, it will be seen that the fruit is provided with a sinuous or zig-zag path of travel prior to the sizing operation, and the aprons are in effect oscillated back and forth transversely of the gradeway. Thus, the pieces of fruit are in effect rolled back and forth in the gradeway so that they can position themselves to be supported by the aprons at their smallest diameter as illustrated in Fig. 5. It is to be noted that the positioning mechanism of my invention is of a simple construction which can be readily installed in sizing apparatus, and which is positive and sure in operation.

While I have shown and described a preferred embodiment of my invention, it will be understood that the invention is capable of variation and modification, and may be embodied in other forms without departing from the spirit and scope of the invention as defined in the claims appended thereto.

I claim:

1. In a machine for handling fruit or the like, a pair of endless longitudinally traveling flexible aprons arranged in side by side spaced relation to support and convey pieces of fruit therebetween, and spaced apart supporting guides beneath said aprons forming a longitudinally extending channel between contiguous edges of the aprons of such size as to hold the conveyed pieces of fruit therein, and having a sidewise zig-zag, whereby a relative lateral shifting movement between said aprons and said guides is effected during the travel of the aprons to roll the pieces of fruit in said channel transversely of their direction of travel and thereby effect uniform positioning thereof.

2. In a machine for handling fruit or the like, a pair of endless longitudinally traveling flexible aprons arranged in side by side spaced relation to support and convey pieces of fruit therebetween, and spaced apart stationary means for supporting said aprons in trough-like relation and forming a longitudinally extending channel between contiguous edges of the aprons and having a sidewise zig-zag, whereby movement of said aprons along said zig-zag channel provides a relative sidewise shifting movement between said aprons and said supporting means during the travel of the aprons to roll the pieces of fruit transversely of their direction of travel and thereby effect uniform positioning thereof.

3. In a machine for handling fruit or the like, a pair of endless longitudinally traveling flexible aprons arranged in side by side spaced relation to support and convey pieces of fruit therebetween, and supporting means for the fruit engaging portions of said aprons forming a longitudinally extending channel between contiguous edges of the aprons of such size as to hold the conveyed pieces of fruit therein, and having a portion disposed in a laterally angular direction with respect to the path of travel of said aprons to provide relative sidewise shifting movement of said aprons and said supporting means during the travel of the aprons, whereby to roll the pieces of fruit in said channel transversely of their direction of travel and thereby effect uniform positioning thereof.

GEORGE P. MARSDEN.